United States Patent
Riezebos et al.

(10) Patent No.: US 9,634,439 B2
(45) Date of Patent: Apr. 25, 2017

(54) CONTACTLESS PLUG CONNECTOR AND CONTACTLESS PLUG CONNECTOR SYSTEM

(71) Applicants: TYCO ELECTRONICS NEDERLAND BV, S-Hertogenbosch (NL); TYCO ELECTRONICS AMP GMBH, Bensheim (DE)

(72) Inventors: Dirk-Jan Riezebos, Kaatsheuvel (NL); Bert Bergner, Bensheim (DE); Gied Habraken, Valkenswaard (NL)

(73) Assignees: TE Connectivity Nederland B.V., 'S-Hertogenbosch (NL); TE Connectivity Germany GmbH, Bensheim (DE)

( * ) Notice: Subject to any disclaimer, the term of this patent is extended or adjusted under 35 U.S.C. 154(b) by 119 days.

(21) Appl. No.: 14/351,079

(22) PCT Filed: Oct. 9, 2012

(86) PCT No.: PCT/EP2012/069974
§ 371 (c)(1),
(2) Date: Apr. 10, 2014

(87) PCT Pub. No.: WO2013/053714
PCT Pub. Date: Apr. 18, 2013

(65) Prior Publication Data
US 2014/0248801 A1    Sep. 4, 2014

(30) Foreign Application Priority Data

Oct. 13, 2011    (EP) ..................... 11185081

(51) Int. Cl.
*H04B 7/00*        (2006.01)
*H01R 13/66*    (2006.01)
*H04B 5/00*        (2006.01)

(52) U.S. Cl.
CPC ....... *H01R 13/6691* (2013.01); *H04B 5/0031* (2013.01); *H04B 5/0037* (2013.01)

(58) Field of Classification Search
CPC ..... H01P 3/121; H01P 5/107; H01R 13/6461; H01R 13/665; H01R 2103/00;
(Continued)

(56) References Cited

U.S. PATENT DOCUMENTS 6,476,520 B1    11/2002 Bohm
6,950,633 B2    9/2005 Kojima
(Continued)

FOREIGN PATENT DOCUMENTS

CN    1965451    5/2007
DE    2609076 A1    9/1977
(Continued)

OTHER PUBLICATIONS

International Preliminary Report on Patentability issued by the International Bureau of WIPO, Geneva, Switzerland, dated Apr. 15, 2014, for International Application No. PCT/EP2012/069974; 7 pages.

(Continued)

*Primary Examiner* — Xin Jia
(74) *Attorney, Agent, or Firm* — Faegre Baker Daniels LLP (57) ABSTRACT

The invention relates to contactless plug connectors and contactless plug connector systems for electromagnetically connecting a corresponding mating plug connector. In order to allow for an electromagnetic connection, the invention suggest providing at least one input terminal for inputting a baseband input signal; an antenna element arranged at the mating end of the contactless plug connector; and a transmitting circuit for modulating the inputted baseband input signal on a predetermined carrier frequency and for trans- (Continued)

mitting the modulated baseband input signal via the antenna element as a radio wave with the predetermined carrier frequency. In particular, the contactless plug connector and contactless plug connector system include an electromagnetic shielding element arranged to surround the transmitting circuit and the antenna element with a rim portion forming an opening at the mating end of the contactless plug connector.

18 Claims, 1 Drawing Sheet

(58) Field of Classification Search
CPC .......... H01R 24/28; H01R 24/76; H04B 3/56; H04B 7/24; H05K 1/0225; H05K 1/0239; H05K 2201/093; H05K 2201/09672; H05K 2201/0969
USPC ....................................................... 455/41.2
See application file for complete search history.

(56) References Cited

U.S. PATENT DOCUMENTS

| | | | |
|---|---|---|---|
| 7,598,923 B2 | 10/2009 | Hardbacker | |
| 2004/0155723 A1* | 8/2004 | Koriyama | H01L 23/66 333/26 |
| 2008/0238688 A1 | 10/2008 | Rofougaran | |
| 2009/0102724 A1* | 4/2009 | Tsutsumi | H01Q 1/2258 343/700 MS |
| 2011/0076944 A1* | 3/2011 | Mihota | H04L 27/02 455/41.2 |
| 2011/0092174 A1 | 4/2011 | Choi | |
| 2011/0221389 A1* | 9/2011 | Won | H02J 7/025 320/108 |
| 2013/0109317 A1* | 5/2013 | Kikuchi | H04B 7/24 455/41.2 |

FOREIGN PATENT DOCUMENTS

| | | | | |
|---|---|---|---|---|
| DE | 19621003 | | 11/1997 | |
| EP | 0323614 | | 7/1989 | |
| EP | 0394714 | A2 | 10/1990 | |
| EP | 0523271 | A1 | 1/1993 | |
| EP | 2280489 | A1 | 2/2011 | |
| GB | 2404094 | A | 1/2005 | |
| JP | WO2006013638 | * | 2/2006 | ............ H01R 13/66 |
| WO | WO2006013638 | * | 2/2006 | ............ H01R 13/66 |

OTHER PUBLICATIONS

International Search Report and Written Opinion issued by the European Patent Office, dated Jan. 24, 2013, for International Application No. PCT/EP2012/069974; 11 pages.
Extended European Search Report issued by the European Patent Office, dated Mar. 12, 2012 for priority Application No. 11185081.4; 6 pages.
First Office Action issued by the Chinese Patent Office, (English translation attached), dated Nov. 30, 2015, for related Chinese Patent Application No. 2012800610707, 23 pages.
International Search Report and Written Opinion issued by the European Patent Office, dated Jan. 23, 2013, for International Application No. PCT/EP2012/070019; 9 pages.
Extended European Search Report issued by the European Patent Office, dated Mar. 14, 2012, for European Application No. 11185079.8; 6 pages.
International Preliminary Report on Patentability issued by the International Bureau of WIPO, dated Apr. 15, 2014, for International Application No. PCT/EP2012/070019; 6 pages.

* cited by examiner

CONTACTLESS PLUG CONNECTOR AND CONTACTLESS PLUG CONNECTOR SYSTEM

BACKGROUND

The invention relates to a contactless plug connector for electromagnetically connecting a corresponding mating connector. In particular, the invention provides a contactless plug connector and contactless plug connector system including a transmitting circuit and/or receiving circuit for transmitting and/or receiving a radio wave of a predetermined carrier frequency.

Generally, the invention relates to contactless plug connectors for data transmissions. A contactless plug connector of the invention may, for instance, comply with known connection interface standards, for instance, Ethernet, USB, CAN, IO-link and RS485. In more detail, the contactless plug connector of the invention may be utilized for industrial devices such as robots, material handling systems, injection molding devices, mining & harvesting equipment and transportation vehicles amongst others and for portable data processing devices such as mobile phones, mobile storage units, mobile music players, mobile video presentation devices, namely for allowing data and power connections under hostile environmental influences.

Industrial devices often rely on cables and connectors, operating in a hostile environment, which wear and tear and do not allow for rotation limiting the freedom of movements of these devices.

Portable data processing devices have evolved in the past from quasi stationary laptop computers to mobile devices allowing for an indoor and outdoor usage. Due to the portability, mobile devices are carried around and are thereby exposed to hostile environmental influences, e.g. dust, dirt, humidity, rain, acid liquids, heat, cold, shock and mechanical stress. In this respect, the connectors of a mobile device, positioned at the boundary between an outside and an inside of the mobile device, require adaptation to the newly diversified operating environments.

In the past, plug connectors were realized as electrical connectors wherein an electrical contact was established between the plug connector and a corresponding mating connector, i.e. receptacle connector.

However, electrical connections are limited to a direct connection between two electrical contacts and the tolerance regarding misalignment between contacts is not very high. Dust, dirt, shock and mechanical stress may adversely effect the establishment of an electrical connection between plug connector and receptacle connector.

Electrical connections are also sensitive to humidity e.g. rain as water may short-circuit electrical contacts in an unintended manner. Further, environmental influences may also deteriorate the contact surface reducing the conductivity of the connector in a mated state.

Accordingly, electrical connectors, though reasonable for an indoor operating environment, are disadvantageous for portable devices operable under more hostile environmental influences.

In the recent past, wireless interfaces have become popular for mobile devices as they overcome disadvantages inherent to an electrical connection. Radio waves do not require a direct contact (i.e. electrical connection).

Accordingly, mobile devices have been designed to incorporate the appropriate radio wave transceiver modules in the housing of the mobile device. In particular, by sealing transceiver modules and other electrical circuits within the housing of a mobile device, it is possible to also established data connections with a mobile device under hostile environmental influences.

However, wireless connections are adversely affected by electromagnetic interference. The electromagnetic influence may have multiple causes and may depend on the radio band in which wireless communication is performed. Industrial, scientific and medical (ISM) radio bands have been initially reserved for emission of radio frequency energy from appliances having other purposes than communication (e.g. microwave oven).

Since electromagnetic interference is expected in the ISM radio bands, governments have permitted unlicensed operation to appliance limiting the electromagnetic emission to the ISM radio bands only and fulfilling certain power requirements.

This financial incentive is a crucial aspect to the operation of many devices and may also be considered a reason for the existence of various wirelessly connected devices communicating in the ISM radio bands. Presently, the number of devices operating in the same ISM radio bands increases and in total a considerable amount of electromagnetic interference is emitted.

Under such constraints, wireless connections are not as robust as electrical connections. In particular, for wireless interfaces a user lacks a clear response whether or not a wireless connection can be established. The amount of interference may decide between successful or non-successful wireless connection establishments. However, as the amount of interference is difficult to estimate and may also change over time, wireless interfaces are considered not as robust as electrical connector interfaces. In other words, for indoor environments electrical plug connectors may be regarded fail-safe in view of a successful connection establishment whereas this is not the case for wireless interface.

Accordingly, technical prejudices against the robustness of wireless connections had to be overcome to arrive at the invention of providing a contactless plug connector with a radio wave antenna.

SUMMARY

The object underlying the invention is to propose a contactless plug connector which reduces susceptibility to hostile environmental influences and thereby overcomes commonly known disadvantages of electrical connectors such as e.g. corrosion, fretting, contact force and plating.

Another object of the invention is to suggest a contactless plug connector which eliminates a ground connection overcoming the conventional need for ground loop compensation circuits.

A further object of the invention is to suggest a contactless plug connector which can ensure highly reliable and robust data connectivity with good signal integrity.

At least one of these objects is solved by the subject matter of the independent claims. Advantageous embodiments are subject to the dependent claims.

A first aspect of the invention is the incorporation of an active transmitter/receiver circuit and an antenna element into the contactless plug connector. The active transmitter/receiver circuit allows transmitting/receiving a radio wave with a predetermined carrier frequency via an antenna element. The radio wave does not depend on direct contact and, hence, allows incorporation of the transmitter/receiver circuit and the antenna element within the housing of the contactless plug connector. This gain in flexibility regarding the structure of the mating surface of the contactless plug connector allows for a mechanically robust design such that the susceptibility to environmental influences is minimized.

A second aspect of the invention is the elimination of electrical connections between the contactless plug connector and the corresponding receptacle connector. Due to the contactless plug connector establishing a wireless connection with the corresponding receptacle connector, electrical connections are unnecessary. The suggested contactless plug connector accordingly dispenses with need for a ground connection between the contactless plug connector and the receptacle connector and thereby overcomes the problems resulting from a ground loop between connected devices.

A third aspect of the invention is a transmitting and/or receiving circuit of the contactless plug connector performing a modulation and/or demodulation of a predetermined carrier frequency. The modulation and/or demodulation operation together with an electromagnetic shielding element enables shielding of the radio wave transmission between contactless plug connector and receptacle connector from external interference which allows for highly reliable and robust data connectivity with good signal integrity.

The first, second and third aspect of this invention can be readily combined with each other in a contactless plug connector as will become apparent from the detailed description.

According to one exemplary implementation of the invention, a contactless plug connector for electromagnetically connecting a corresponding mating connector is provided. The contactless plug connector comprises: at least one input terminal for inputting a baseband input signal; an antenna element arranged at the mating end of the contactless plug connector; a transmitting circuit for modulating the inputted baseband input signal on a predetermined carrier frequency and for transmitting the modulated baseband input signal via the antenna element as a radio wave with the predetermined carrier frequency; and an electromagnetic shielding element arranged to surround the transmitting circuit and the antenna element with a rim portion forming an opening at the mating end of the contactless plug connector.

According to a more detailed embodiment, the rim portion of the shielding element is arranged such that it overlaps, in the mated state, a corresponding shielding element of the mating connector by a distance corresponding to a quarter of the wavelength of the predetermined carrier frequency.

Due to the overlap of a quarter wavelength, the shielding effect improves and signals may propagate between the two shielding elements without need for an electric connection.

In a more detailed embodiment, the contactless plug connector comprises: a receiving circuit for demodulating a radio wave received via the or another antenna element to a baseband output signal; and at least one output terminal for outputting the baseband output signal.

With a bi-directional communication circuit, the contactless plug connector can be more flexibly utilized. The contactless plug connector of this embodiment can be readily used with known data transmission standards.

In another more detailed embodiment, the contactless plug connector comprises: a power terminal for connection to a power supply; and an inductive coupling element connected to the power terminal for transmitting/receiving power to/from a corresponding mating connector. The inductive coupling element is arranged so as to form in the mated state an induction loop with a corresponding inductive coupling element of the mating connector.

With a bi-directional communication circuit and power transmission capabilities, the contactless plug connector of this embodiment can be readily used with known connection interface standards, for instance, Ethernet, USB, CAN, IO-link and RS485.

In a further more detailed embodiment, the transmitting circuit is connected to the power terminal.

Due to the internal connection between power terminal and transmission circuit, the contactless plug connector reduces the number of external interfaces to a minimum.

According to another exemplary implementation of the invention, a contactless plug connector for electromagnetically connecting a corresponding mating connector is provided. The contactless plug connector comprises: an antenna element arranged at the mating end of the contactless plug connector; a receiving circuit for demodulating a radio wave of a predetermined carrier frequency received via the antenna element to a baseband output signal; at least one output terminal for outputting the demodulated radio wave as the baseband output signal; and an electromagnetic shielding element arranged to surround the receiving circuit and the antenna element with a rim portion forming an opening at the mating end of the contactless plug connector According to a more detailed embodiment, the rim portion of the shielding element is arranged such that it overlaps, in the mated state, a corresponding shielding element of the mating connector by a distance corresponding to a quarter of the wavelength of the predetermined carrier frequency.

Due to the overlap of a quarter wavelength, the shielding effect improves and signals may propagate between the two shielding elements without need for an electric connection.

In a more detailed embodiment, the contactless plug connector comprises: at least one input terminal for inputting a baseband input signal; a transmitting circuit for modulating the inputted baseband input signal on a predetermined carrier frequency and for transmitting the modulated baseband input signal via the or another antenna element as a radio wave with the predetermined carrier frequency.

With a bi-directional communication circuit, the contactless plug connector can be more flexibly utilized. The contactless plug connector of this embodiment can be readily used with known data transmission standards.

In another more detailed embodiment, the contactless plug connector comprises: a power terminal connected to the for connection to a power supply; and an inductive coupling element connected to the power terminal for transmitting/receiving power to/from a corresponding mating connector. The inductive coupling element is arranged so as to form in the mated state an induction loop with a corresponding inductive coupling element of the mating connector.

With a bi-directional communication circuit and power transmission capabilities, the contactless plug connector of this embodiment can be readily used with known connection interface standards, for instance, Ethernet, USB, CAN, IO-link and RS485.

In a further more detailed embodiment, the receiving circuit is connected to the power terminal.

Due to the internal connection between power terminal an transmission circuit, the contactless plug connector reduces the number of external interfaces to a minimum. According to different embodiment, the antenna element of the contactless plug connector is a circular polarized antenna.

With a circular polarized antenna, rotation-angle independent mating of the contactless plug connector with the corresponding mating connector is enabled. The circular polarized antenna can be either left handed or right handed polarized to create a proper connection. In case of a contactless plug connector including two antenna elements (i.e. the first antenna element being for transmission and the second antenna element being for reception of a modulated baseband signal), the first antenna element has preferably a different handed polarization from the second antenna element.

In another embodiment, the contactless plug connector comprises a housing structure arranged so as to prevent the shielding element from directly contacting the corresponding shielding element of the corresponding mating connector.

Providing a housing structure with guides allows for a guided mating movement and prevents from interconnecting shielding elements. Thereby, the connectors always stay in galvanic isolation from each other without need for isolating material.

In a more detailed embodiment, the shielding element of the contactless plug connector is surrounded by dielectric material.

The provision of a dielectric material allows for a durable and robust galvanic isolation between the connectors in a mated state.

According to another more detailed embodiment, the contactless plug connector is embedded in a housing that is sealed against intrusion of water.

By embedding the contactless plug connector in a housing that is sealed against intrusion of water, the contactless plug connector can be utilized under hostile environmental influences without the risk of short-circuiting the circuitry of the contactless plug connector.

In a further more detailed embodiment, the connector is provided as a radial connector allowing the connector to rotate in a mated state and wherein the shielding element has a cylindrical shape.

As a radial connector, the contactless plug connector can be more easily applied to the corresponding mating connector.

According to a further exemplary implementation of the invention, a contactless plug connector system is provided comprising the contactless plug connector and a corresponding mating connector. The rim portion of the shielding element of the contactless plug connector is arranged so as to fit closely about the corresponding shielding element of the mating connector.

The accompanying drawings are incorporated into the specification and form a part of the specification to illustrate several embodiments of the present invention. These drawings, together with a description, serve to explain the principles of the invention. The drawings are merely for the purpose of illustrating the preferred and alternative examples of how the invention can be made and used, and are not to be construed as limiting the invention to only the illustrated and described embodiments. Furthermore, several aspects of the embodiments may form—individually or in different combinations—solutions according to the present invention. Further features and advantages will be become apparent from the following more particular description of the various embodiments of the invention as illustrated in the accompanying drawings, in which like references refer to like elements, and wherein:

Figure 1:
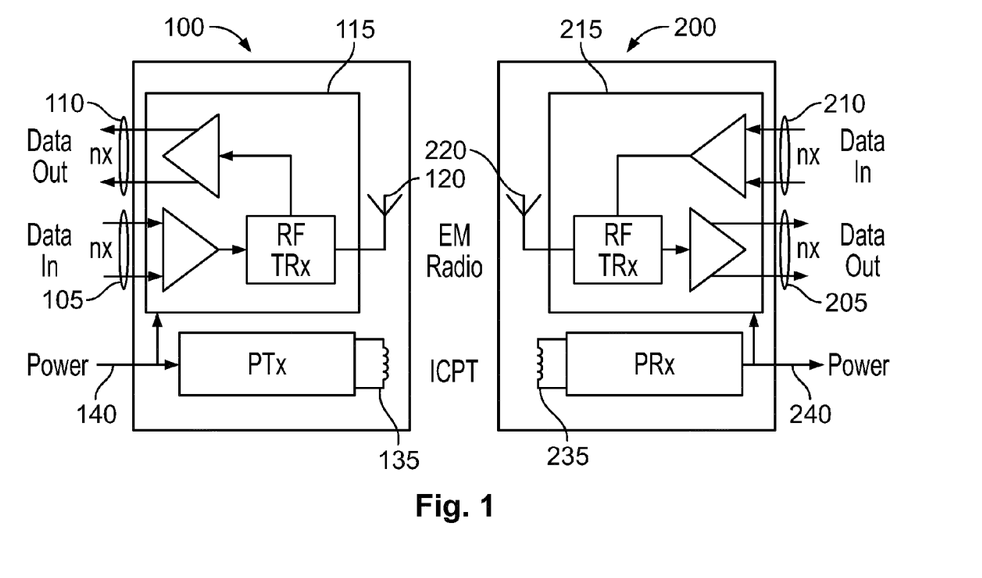
FIG. 1 shows a schematic diagram of an exemplary contactless plug connector system according to an exemplary embodiment of the invention.

Referring to FIG. 1, a schematic diagram of a contactless plug connector system according to an exemplary embodiment of the invention is shown. The contactless plug connector system of this embodiment may be used for data connections complying with known transmission standards, for instance, Ethernet, USB, CAN, IO-link and RS485. The contactless plug connector system comprises a contactless plug connector 100 and a corresponding mating connector 200. The corresponding mating connector may be realized as a receptacle connector (i.e. socket) or as an inverse plug connector.

The contactless plug connector 100 of the embodiment shown in FIG. 1 comprises an at least one input terminal 105, at least one output terminal 110, a transmitting and/or receiving circuit 115 and an antenna element 120. Depending on the data connection for which the contactless plug connector is configured, there may be one or more input terminals and a corresponding number of one or more output terminals. For instance, the USB standard specifies two differential data lines. Accordingly, a contactless plug connector 100 for USB connections would include two input terminals and two output terminal.

However, the contactless plug connector 100 of the invention is not necessarily a bi-directional data transmission connector. According to another embodiment of the invention, a contactless plug connector includes at least one input terminal, a transmitting circuit and an antenna element, whereas the corresponding mating connector only includes at least one output terminal, a receiving circuit and an antenna element. Such a realization of the contactless plug connector according to the invention may be advantageous for time critical transmissions, highly fail safe appliances or for cost optimization reasons. The contactless plug connector of this embodiment allows for uni-directional data transmissions only.

For the transmission operation, a baseband input signal is input via the at least one input terminal 105 to the transmitting and/or receiving circuit 115 of the contactless plug connector 100 of the embodiment shown in FIG. 1. The transmitting and/or receiving circuit 115 modulates the baseband input signal on a predetermined carrier frequency. Thereafter, the transmitting and/or receiving circuit 115 outputs the modulated input signal to the antenna element 120 so as to emit the modulated input signal as a radio wave of the predetermined carrier frequency.

Similarly, for the reception operation, the transmitting and/or receiving circuit 115 of contactless plug connector 100 of the embodiment shown in FIG. 1 receives via the antenna element 120 a radio wave of a predetermined carrier frequency. Thereafter, the transmitting and/or receiving circuit 115 demodulates the received radio wave and outputs the demodulated radio wave as a baseband output signal to the at least one output terminal 110.

Due to the fact that the transmitting and/or receiving circuit 115 performs only a modulating and/or demodulating operation of a radio wave, the delay introduced by the contactless plug connector system is very low. In particular, the transmitting and/or receiving circuit 115 does not perform data processing which is inherent to commonly known wireless transmission standards, for instance, as required by the WiFi protocol stack.

In other words, the transmitting and/or receiving circuit 115 directly modulates to the inputted signal without any intermittent processing compliant to a protocol stack (i.e. no OSI 2 or 3 layers). Thereby, delays in the signal path can be avoided and at the same time providing transparency to the signal. Due to the transparency to the signal, it is possible to transfer a baseband signal in a contactless manner with the contactless plug connector behaving like a "conductive based" connector.

It has to be noted that, prior to the transmitting and/or receiving circuit 115 modulating or demodulating the baseband signal, the contactless plug connector may perform minor signal conversions on the inputted signal, as for example an adaptation of the peak voltage level or a shift in the voltage range of the baseband signal so as to comply with the requirements of the transmitting and/or receiving circuit 115.

In an exemplary realization of the embodiment shown in FIG. 1, it has proven advantageous for the transmitter and/or receiver circuit 115 to modulate and/or demodulate an input baseband signal on/of approximately 60 GHz carrier frequency. The 60 GHz ISM band allows for a fast data transmission between the contactless plug connector 100 and the corresponding mating connector 200 and limits the amount of delay introduced in the data transmission to approximately 10 ns. For example, using a carrier frequency of 60.5 GHz maximizes the bandwidth of a single carrier system within the ISM band of 57-64 GHz band. Accordingly, the contactless plug connector system complies with the tolerances defined, for instance, in the USB standard.

For a successful data transmission, the contactless plug connector 100 of the embodiment shown in FIG. 1 and the corresponding mating connector 200 are arranged in a mated state so that an electromagnetic radio wave, emitted by the antenna element 120 of the contactless plug connector 100, can be received by the antenna element 220 of the corresponding mating connector 200. Accordingly, in the mated state the contactless plug connector 100 is electromagnetically connected to the corresponding mating connector 200.

In particular, an optimization of the distance and the alignment between the antenna element 120 of the contactless plug connector 100 and the antenna element 220 of the corresponding mating connector 200 may advantageously effect the data transmission between the contactless plug connector 100 and the corresponding mating connector 200. The optimized distance and the alignment between the antenna element 120 and the antenna element 220 may influence the arrangement of the antenna element within the housing of the contactless plug connector, respectively, the corresponding mating connector 200. In general, it is preferable to arrange the antenna element 120 at the mating end of contactless plug connector 100.

The contactless plug connector system of the embodiment shown in FIG. 1 is not limited to data connections only. The contactless plug connector system of the embodiment shown in FIG. 1 also allows for transmission of power between contactless plug connector 100 and the corresponding mating connector 200. Consequently, the contactless plug connector system of the embodiment shown in FIG. 1 realizes a full-featured data and power connection and is compatible with known transmission standards, for instance, Ethernet, USB, CAN IO-link and RS485.

For this purpose, the contactless plug connector 100 of FIG. 1 includes an inductive coupling element 135 and a power terminal 140, wherein the inductive coupling element 135 is coupled with the power terminal 140. Similarly, the corresponding mating connector 200 includes a corresponding inductive coupling element 235 and a power terminal 240, wherein the corresponding inductive coupling element 235 is coupled with the output terminal 240.

As shown in FIG. 1, the contactless plug connector 100 may additionally include an intermediate voltage regulator (PTx) connected to the power terminal 140 and to the inductive coupling element 135. The intermediate voltage regulator (PTx) may convert the voltage level of the power terminal 140 to a predefined voltage level advantageous for transmission via the inductive coupling element 135. Additionally or alternatively, the intermediate voltage regulator (PTx) may include a DC/AC converter for converting a DC input voltage from the power terminal 140 to an AC output voltage so as to allow transmission via the inductive coupling element 135.

Accordingly, the corresponding mating connector 200 may also include an intermediate voltage regulator (PRx) connected to the power terminal 240 and to the inductive coupling element 235. The voltage regulator (PRx) of the corresponding mating connector 200 is configured inverse to the voltage regulator (PTx) of the contactless plug connector 100.

In another embodiment according to the invention, the contactless plug connector system allows the transmission of power in both directions. For this purpose, the contactless plug connector 100 and the corresponding mating connector 200, each includes a detector for detecting whether to receive power via the respective power terminal (140, 240) or via the respective inductive coupling element (135, 235).

The contactless plug connector 100 of the embodiment shown in FIG. 1 further includes an electrical connection between the power terminal 140 and the transmitting and/or receiving circuit 115 so as to utilize the power at the power terminal 140 for transmitting and/or receiving a radio wave with the predetermined frequency.

Similarly, the corresponding mating connector 200 of the embodiment shown in FIG. 1 includes an electrical connection between the power terminal 240 and the transmitting and/or receiving circuit 115 so as to utilize the power at the power terminal 240 for transmitting and/or receiving a radio wave with the predetermined frequency.

For a good inductive coupling between the contactless plug connector 100 of the embodiment shown in FIG. 1 and the corresponding mating connector 200, the inductive coupling element 135 of the contactless plug connector 100 and the corresponding inductive coupling 235 of the mating connector 200 are aligned to each other. In this respect the inductive coupling element 135 is arranged in the housing of the contactless plug connector 100 so that it forms in the mated state an induction loop with the corresponding inductive coupling element 235 of the mating connector 200.

A reduced distance between the inductive coupling element 135 of the contactless plug connector 100 and the corresponding inductive coupling 235 of the mating connector 200 may be advantageous for a reduction of transmission power losses. Accordingly, it is preferable to arrange the indicative coupling element 135 at the mating end of contactless plug connector 100.

According to another, more detailed embodiment the invention, a connector is configured so that a reception of a predetermined amount of power triggers the transmission of predefined information, for instance status information or initialization information. In more detail, upon the contactless plug connector 100 starting the transmission of power to the corresponding mating connector 200, the corresponding mating connector 200 detects a reception of a predetermined amount of power via the inductive coupling element 235, supplies received power to the transmitting and/or receiving element 215, which thereupon initiates the transmission of predefined information to the contactless plug connector 100. Thereby, the mated state is detectable by the contactless plug connector 100 and by the corresponding mating connector 200. Preferably, the transmission of predefined information is short in time to allow a fast activation of the connection.

Figure 2:
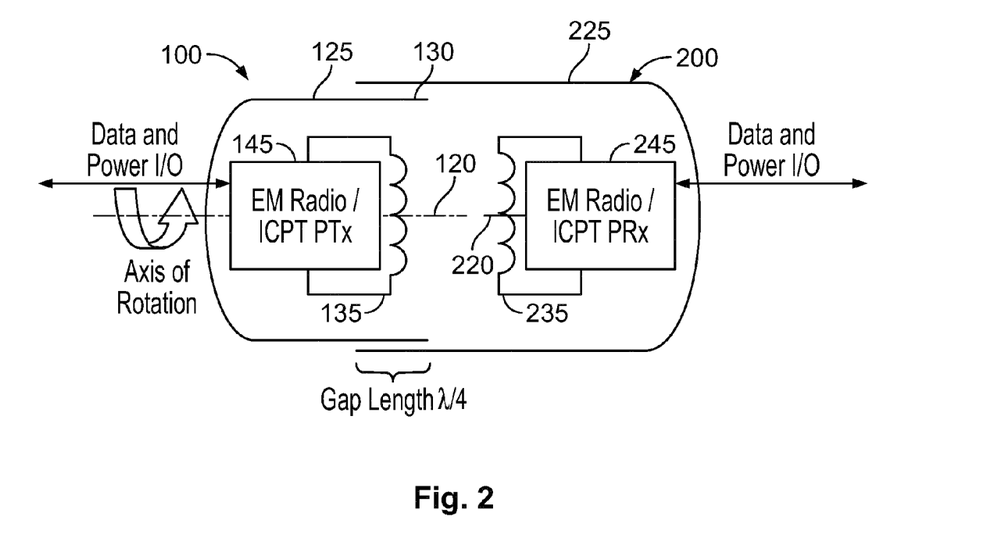
FIG. 2 shows a contactless plug connector with a corresponding mating connector in a mated state according to the exemplary embodiment of the invention.

Referring now to FIG. 2, a contactless plug connector 100 according to the exemplary embodiment of the invention is shown with a corresponding mating connector 200 in mated state. The contactless plug connector of FIG. 2 is based on the contactless plug connector of FIG. 1 where corresponding parts are given corresponding reference numerals and terms. The detailed description of corresponding parts has been omitted for reasons of conciseness.

In detail, the contactless plug connector 100 of the embodiment shown in FIG. 2 includes an antenna element 120 and an inductive coupling element 135. For simplicity reasons, the antenna element 120 and the inductive coupling element 135 are illustrated as being connected to drive circuit 145. The drive circuit 145 includes a transmitting and/or receiving circuit 115 and realizes connections for data and power input/output and implements the respective terminals 105, 110 and 140. According to another embodiment, the drive circuit 145 may also include the voltage regulator (PTx) as described in connection with FIG. 1.

Similarly, the corresponding mating connector 200 of the embodiment shown in FIG. 2 includes an antenna element 220 and an inductive coupling element 235. For simplicity reasons, the antenna element 220 and the inductive coupling element 235 are illustrated as being connected to drive circuit 245. The drive circuit 245 includes a transmitting and/or receiving circuit 215 and realizes connections for data and power input/output and implements the respective terminals 205, 210 and 240. According to another embodiment, the drive circuit 245 may also include the voltage regulator (PRx) as described in connection with FIG. 1.

The antenna element 120 of the contactless plug connector 100 may be realized as a circular polarized antenna. Similarly, the antenna element 220 of the contactless plug connector 200 may be realized as circular polarized antenna.

The distinction between a left, respective, right handed circular polarization allows for avoiding an unintended connection between the contactless plug connector's transmitting circuit (Tx) and the contactless plug connector's receiving circuit (Rx) when both circuits are operating at a same frequency.

According to an example, the connection from the contactless plug connector's transmitting circuit (Tx) to the mating connector's receiving circuit (Rx) may be realized as left handed circular polarized, and the connection from the contactless plug connector's receiving circuit (Rx) to the mating connector's transmitting circuit (Tx) may be realized right handed circular polarized or vice versa. In this example, since the contactless plug connector's transmitting circuit (Tx) and the contactless plug connector's receiving circuit (Rx) operate at different handed circular polarizations, the contactless plug connector's receiving circuit (Rx) does not receive (possibly as a reflection) a modulated signal from the transmitting circuit (Tx), hence, avoiding an unintended connection between the contactless plug connector's transmitting circuit (Tx) and it's receiving circuit (Rx).

There are different possibilities for implementing the antenna element 120 and the transmitting and/or receiving circuit 120. First of all, the antenna element 120 may be directly connected to the feed of the transceiver unit 115. Alternatively, the antenna element 120 and the transmitting and/or receiving circuit 115 may be realized in a module. According to another alternative, the antenna element 120 for transmitting and/or receiving a circular polarized electromagnetic radio wave may be connected via a non-polarized or linearly-polarized electromagnetic connection to the transmitting and/or receiving circuit 120. In the last alternative realization, the antenna element may be understood as an element capturing and converting the non-polarized or linearly-polarized radio wave from the transmitting and/or receiving circuit 115 into a circular polarized wave and vice versa.

Further, the contactless plug connector 100 of the embodiment shown in FIG. 2 includes a shielding element 125 surrounding the antenna element 120, the inductive coupling element 135 and drive circuit 145. The shielding element 125 is provided to shield in the mated state electromagnetic transmission between antenna element 120 of the contactless plug connector 100 and the corresponding antenna element 220 of the mating connector 200 from external electromagnetic interference. For this purpose, the shielding element 125 may be realized of conductive and/or magnetic material or of other materials with the characteristic of acting as a barrier to an electromagnetic field.

The shielding element 125 of the contactless plug connector 100 of the embodiment shown in FIG. 2 has an opening at the mating end of the contactless plug connector 100. This opening in the shielding element 125 allows for an unaffected electromagnetic transmission between the antenna element 120 of the contactless plug connector 100 and the corresponding antenna element 220 of the mating connector 200 in the mated state.

In more detail, the shielding element 125 of the contactless plug connector 100 is realized with a rim portion 130 forming the opening at the mating of the contactless plug connector 100. The rim portion 130 of the contactless plug connector 100 may protrude from the mating end of the contactless plug connector 100 or may be flush with the mating end of the contactless plug connector 100.

In the embodiment shown in FIG. 2, the shielding element 125 of the contactless plug connector 100 interacts in the mated state with the corresponding shielding element 225 of the mating connector 200 so as to form an overlap of a predefined distance. In other words, the rim portion 130 of the shielding element 125 of the contactless plug connector 100 overlaps, in the mated state, the rim portion of the corresponding shielding element 225 of the mating connector 200.

In detail, the rim portion 130 of the shielding element 125 of the contactless plug connector 100 is realized as being flush with the mating end of the contactless plug connector 100 and the rim portion of the corresponding shielding element 225 of the mating connector 200 protrudes beyond the mating end of the mating connector 200. In particular, the rim portion of the corresponding shielding element 225 of the mating connector 200 protrudes beyond the mating end of the mating connector 200 by a distance so as to overlap in the mated state the shielding element 125 of the contactless plug connector 100.

Due to this overlap, in the mated state the transmitting and/or receiving circuit 115, the antenna element 120 and the inductive coupling element 135 of the contactless plug connector 100 as well as the transmitting and/or receiving circuit 215, the antenna element 220 and the inductive coupling element 235 of the corresponding mating connector 200 are encapsulated by the shielding element 125 of the contactless plug connector 100 and the shielding element 225 of the corresponding mating connector 200.

Consequently, the interaction between the shielding element 125 of the contactless plug connector 100 and the shielding element 225 of the corresponding mating connector 200 improves for the mated state the immunity to external electromagnetic interference, to electrostatic discharges and to other external surges. At the same time, the interaction between the shielding element 125 of the contactless plug connector 100 and the shielding element 225 of the corresponding mating connector 200 reduces in the mated state the emission of electromagnetic energy and of magnetic flux in close proximity to the contactless plug connector 100 and to the corresponding mating connector 200.

In the embodiment shown in FIG. 2, the rim portion 130 of the shielding element 125 of the contactless plug connector 100 is further adapted to fit closely about/under the shielding element 225 of the corresponding mating connector 200. In other words, the rim portion 130 of the shielding element 125 of the contactless plug connector 100 has essentially the same profile as the rim portion of the shielding element 225 of the corresponding mating connector 200 with a slightly larger/smaller diameter. Thereby the shielding effect of the shielding elements 125 and 225 further improves.

As apparent from discussion on the overlap between the shielding element 125 of the contactless plug connector 100 and the shielding element 225 of the corresponding mating connector 200, the overlap is only present when the contactless plug connector 100 is mated with the corresponding mating connector 200. Accordingly, for each of the contactless plug connector and the corresponding mating connector 200, the overlap is based on the distance relationship between the rim portion of the shielding element 125, 225 of the respective connector 100, 200 and the corresponding mating end (i.e. mating position defined by the mating end) of the connector 100, 200.

Assuming for the sake of argument that the corresponding mating connector 200 has a fixed distance relationship between the rim portion of the shielding element 225 and the mating end (i.e. mating position defined by the mating end); then the length of the rim portion 130 of the shielding element 125 of the contactless plug connector 100 determines the length of the overlap between the shielding element 125 of the contactless plug connector 100 and the shielding element 225 of the corresponding mating connector 200.

Further to the embodiment shown in FIG. 2, the distance of the overlap between the shielding element 125 of the contactless plug connector 100 and the shielding element 225 of the corresponding mating connector 200 corresponds to a quarter of the wavelength of the predetermined carrier frequency. In particular, a quarter wavelength overlap is advantageous since the input impedance of an open quarter-wave choke section is zero and a signal on one of the shielding elements 125, 225 effectively sees zero impedance and flows across the gap with minimal power loss while maintaining a the contactless plug connector at galvanic isolation to the corresponding mating connector 200.

Accordingly, the contactless plug connector 100 enables a signal from an optional ground terminal connected to shielding element 125 to flow, in the mated state, across the gap with minimal power loss to the shielding element 225 of the corresponding mating connector 200 connected to an optional ground terminal. Thereby, the shielding effect improves without need for a ground loop between the contactless plug connector 100 and the corresponding mating connector 200.

For a contactless plug connector 100 including a transmitting and/or receiving circuit 115 and an antenna element 120 adapted for emission and/or reception of radio waves with a carrier wave frequency of approximately 60 GHz, the distance overlap of the shielding element 125 of the contactless plug connector 100 in the mated state with the corresponding shielding element 225 of the mating connector 200 has a length of approximately $\lambda/4=1.25$ mm, the wavelength $\lambda$ being determined as follows: $\lambda=3e+8$ m/6e+10=5e-3 m.

According to the more detailed embodiment shown in FIG. 2, the contactless plug connector 100 may be realized as a radial connector with the axis of rotation aligned with axis of the mating movement for mating the contactless plug connector 100 with the corresponding mating connector 200. Due to a realization as radial connector, the usability of the contactless plug connector 100 improves since the contactless plug connector 100 can be more easily applied to the corresponding mating connector 200. In other words, a radial connector design allows for an increase in robustness of the contactless plug connector system of contactless plug connector 100 and corresponding mating connector 200. It also allows for applications where the contactless plug connector must be able to rotate n times 360 degrees without getting entanglements of cables.

In case of a contactless plug connector 100 being realized as a radial connector, the shielding element 125 of the contactless plug connector 100 may be provided in a cylindrical shape.

According to another more detailed embodiment, the contactless plug connector 100 further includes a housing structure arranged so as to prevent the shielding element 125 of the contactless plug connector 100 from directly contacting the corresponding shielding element 225 of the corresponding mating connector 200. In particular, it is advantageous to prevent the shielding element 125 of the contactless plug connector 100 from directly contacting the shielding element 225 of the corresponding mating connector 200 in order to ensure a galvanic isolation of the contactless plug connector 100 and the corresponding mating connector 200 at any time.

In a further more detailed embodiment, the housing structure of the contactless plug connector 100 is provided to allow mating with a corresponding mating connector 200 only in a guided movement. The guided movement may be implemented to restrict a lateral displacement of the contactless plug connector during mating with the corresponding mating connector to a predetermined lateral displacement value which is less than a lateral space between the shielding element 125 of the corresponding plug connector 100 and the shielding element 225 of the corresponding mating connector 200 in the mated state.

Another, more detailed embodiment provides for a shielding element 125 of contactless plug connector 100 with an outside which is completely sealed by dielectric material. For dielectric material, the fabrication may employ only a single dielectric material for the contactless plug connector 100, namely a material which can be used for a housing structure as well as an outside sealing material. Thereby, the production costs and the fabrication steps of the contactless plug connector 100 may be reduced. Alternatively, the shielding element 125 of the contactless plug connector 100 may be externally and internally sealed with a rubber-based dielectric material in order to improve handling of the contactless plug connector 100.

In a further more detailed embodiment, either one of the contactless plug connector 100 and the corresponding mating connector 200, specifically the connector acting as receptacle connector may be embedded in housing sealed against intrusion of water or other materials.

| Reference Numerals | |
|---|---|
| Reference Numerals | Description |
| 100 | contact len plug connector |
| 105 | input terminal |
| 110 | output terminal |
| 115 | transmitting/receiving circuit |
| 120 | antenna element |
| 125 | shielding element |
| 130 | rim position of shielding element |
| 135 | inductive coupling element |
| 140 | power terminal |
| 145 | drive circuit |
| 200 | mating connectors |
| 205 | output terminal |
| 210 | input terminal |
| 215 | transmitting/receiving circuit |
| 220 | antenna element |
| 225 | shielding element |
| 235 | inductive element |
| 240 | power element |
| 245 | drive circuit |

The invention claimed is:

1. A contactless plug connector for electromagnetically connecting a corresponding mating connector comprising:
at least one input terminal for inputting a baseband input signal;
an antenna element arranged at the mating end of the contactless plug connector;
a transmitting circuit for modulating the inputted baseband input signal on a predetermined carrier frequency and for transmitting the modulated baseband input signal via the antenna element as a radio wave with the predetermined carrier frequency;
an electromagnetic shielding element arranged to surround the transmitting circuit and the antenna element with a rim portion forming an opening at the mating end of the contactless plug connector, wherein the rim portion of the shielding element is arranged such that it overlaps, in a mated state, a corresponding shielding element of the mating connector by a predefined distance based on the predetermined carrier frequency,
wherein the connector is provided as a radial connector allowing the connector to rotate in the mated state and the shielding element has a cylindrical shape; and
a power terminal for connection to a power supply; and
an inductive coupling element connected to the power terminal for transmitting/receiving power to/from the corresponding mating connector,
wherein the inductive coupling element is arranged so as to form in the mated state an induction loop with a corresponding inductive coupling element of the mating connector.

2. The contactless plug connector according to claim 1, wherein the predefined distance corresponds to a quarter of the wavelength of the predetermined carrier frequency.

3. The contactless plug connector according to claim 1, further comprising:
a receiving circuit for demodulating a radio wave received via the or another antenna element to a baseband output signal; and
at least one output terminal for outputting the baseband output signal.

4. The contactless plug connector according to claim 1, wherein the transmitting circuit is connected to the power terminal.

5. The contactless plug connector according to claim 1, wherein the antenna element is a circular polarized antenna.

6. The contactless plug connector according to claim 1, further comprising a housing structure arranged so as to prevent the shielding element from directly contacting the corresponding shielding element of the corresponding mating connector.

7. The contactless plug connector according to claim 1, wherein the shielding element is surrounded by dielectric material.

8. The contactless plug connector according to claim 1, wherein the connector is embedded in a housing that is sealed against intrusion of water.

9. A contactless plug connector system comprising a contactless plug connector according to claim 1 and a corresponding mating connector, wherein the rim portion of the shielding element of the contactless plug connector is arranged so as to fit closely about the corresponding shielding element of the mating connector.

10. A contactless plug connector for electromagnetically connecting a corresponding mating connector comprising:
an antenna element arranged at the mating end of the contactless plug connector;
a receiving circuit for demodulating a radio wave of a predetermined carrier frequency received via the antenna element to a baseband output signal;
at least one output terminal for outputting the demodulated radio wave as the baseband output signal;
an electromagnetic shielding element arranged to surround the receiving circuit and the antenna element, with a rim portion forming an opening at the mating end of the contactless plug connector;
a power terminal for connection to a power supply; and
an inductive coupling element connected to the power terminal for transmitting/receiving power to/from a corresponding mating connector;
wherein the inductive coupling element is arranged so as to form, in a mated state, an induction loop with a corresponding inductive coupling element of the mating connector,
wherein the connector is provided as a radial connector allowing the connector to rotate in the mated state and the shielding element has a cylindrical shape, and
wherein the rim portion of the shielding element is arranged such that it overlaps, in the mated state, a corresponding shielding element of the mating connector by a distance corresponding to a quarter of the wavelength of the predetermined carrier frequency.

11. The contactless plug connector according to claim 10, further comprising:
at least one input terminal for inputting a baseband input signal;
a transmitting circuit for modulating the inputted baseband input signal on a predetermined carrier frequency and for transmitting the modulated baseband input signal via the or another antenna element as a radio wave with the predetermined carrier frequency.

12. The contactless plug connector according to claim 10, wherein the receiving circuit is connected to the power terminal.

13. The contactless plug connector according to claim 10, wherein the antenna element is a circular polarized antenna.

14. The contactless plug connector according to claim 10, further comprising a housing structure arranged so as to prevent the shielding element from directly contacting the corresponding shielding element of the corresponding mating connector.

15. The contactless plug connector according to claim 10, wherein the shielding element is surrounded by dielectric material.

16. The contactless plug connector according to claim 10, wherein the connector is embedded in a housing that is sealed against intrusion of water.

17. A contactless plug connector system comprising a contactless plug connector according to claim 10 and a corresponding mating connector, wherein the rim portion of the shielding element of the contactless plug connector is arranged so as to fit closely about the corresponding shielding element of the mating connector.

18. A contactless plug connector for electromagnetically connecting a corresponding mating connector comprising:

at least one input terminal for inputting a baseband input signal;

an antenna element arranged at the mating end of the contactless plug connector;

a transmitting circuit for modulating the inputted baseband input signal on a predetermined carrier frequency and for transmitting the modulated baseband input signal via the antenna element as a radio wave with the predetermined carrier frequency; and an electromagnetic shielding element arranged to surround the transmitting circuit and the antenna element with a rim portion forming an opening at the mating end of the contactless plug connector, wherein the connector is provided as a radial connector allowing the connector to rotate in a mated state and wherein the shielding element has a cylindrical shape.

* * * * *